358-84 SR 358-84 SEARCH ROOM
OR 2,996,580

Aug. 15, 1961 J. D. REID 2,996,580

CLOSED-CIRCUIT COMMUNICATIONS SIGNAL DISTRIBUTION SYSTEM

Filed Jan. 30, 1958 3 Sheets-Sheet 1

INVENTOR.
JOHN D. REID
BY
Darby & Darby
ATTORNEYS.

CLOSED-CIRCUIT COMMUNICATIONS SIGNAL DISTRIBUTION SYSTEM

INVENTOR.
JOHN D. REID
BY
Darby & Darby
ATTORNEYS.

CLOSED-CIRCUIT COMMUNICATIONS SIGNAL DISTRIBUTION SYSTEM

Filed Jan. 30, 1958 3 Sheets-Sheet 3

INVENTOR.
JOHN D. REID
BY Darby & Darby
ATTORNEYS.

United States Patent Office 2,996,580
Patented Aug. 15, 1961

2,996,580
CLOSED-CIRCUIT COMMUNICATIONS SIGNAL DISTRIBUTION SYSTEM

John Drysdale Reid, Little Rock, Ark., assignor to A.R. & T. Electronics, Inc., North Little Rock, Ark., a corporation of Arkansas Filed Jan. 30, 1958, Ser. No. 712,229
14 Claims. (Cl. 179—1)

This invention relates to closed-circuit distribution systems for radio or television communications signals and the like, and more particularly to such systems having means for conducting an audience survey.

A "closed-circuit" distribution system for radio or television signals is a system in which a source of communications signals, whether radio or television, is coupled by a transmission line to receivers located in the homes or offices of the system subscribers. The communications signals from the source are transmitted over the transmission line, so that only those receivers which are coupled to the line are permitted to receive them. Systems of this type are readily adapted for use as toll systems or as community receiving systems. In toll systems, the subscribers pay a fee for the privilege of receiving radio or television programs of a special nature, such as "first-run" motion pictures and outstanding events in the sports world. Community receiving systems are often used in geographical areas which are not served by commercial broadcasting stations or in areas where reception of broadcast signals is poor. These systems usually include some means, such as a microwave link, for example, for relaying a good quality signal from a remotely located broadcast transmitter to the community in which the system is installed. This "good quality" signal is then distributed to the receivers of the system subscribers over a transmission line. In both types of closed-circuit distribution systems however, the source of communications signals may be a local station, at which the programs originate, or the terminal station of a relay system for relaying the programs from remotely located stations.

The source of communications signals is generally located at a central station from which local distribution is effected by means of transmission lines. Where more than one source of communications signals is located at the central station, a separate transmission line is used to couple each source to the receivers, so that the subscriber has a choice of programs which he can receive. Inasmuch as the receivers are usually commercial broadcast receivers, they are adapted to receive radio or television signals at carrier frequencies assigned by the Federal Communications Commission. Accordingly, if the communications signals transmitted over the transmission lines are at other than broadcast frequencies, frequency conversion means may be provided at each such receiver to convert the carrier frequencies of the received signals to frequencies which the receivers are designed to receive. When the nature of the installation permits the use of specially designed receivers, the frequency conversion means may be omitted and the receiver so designed as to directly receive the distributed communications signals. For example, in a hotel installation each receiver could have its IF section designed to directly receive the distributed signals, thus eliminating the RF section. This would greatly facilitate the transistorization of such receivers, with its attendant benefits of reduced power consumption, improved reliability and reduced maintenance.

Where several sources of communications signals are coupled to the receivers by separate transmission lines, it is expedient to transmit all the signals at the same carrier frequency, so that interference from local sources, such as amateur, industrial, scientific and medical equipment, is minimized and a fixed frequency converter may be employed at each receiver. Furthermore, the common carrier frequency of the transmitted signals should be made lower than the range of broadcast frequencies, so that excessive line losses are reduced. This of course would not constitute a problem where the programs are locally produced, since the desired carrier frequency of the transmitted signals may be chosen at the central station. When the programs are relayed from distant broadcast stations however, frequency conversion means are employed at the central station to reduce the carrier frequency of the received signals to a value suitable for transmission over the transmission lines.

In the operation of closed-circuit radio or television distribution systems, it is often desirable to conduct an audience survey to determine on a quantitative basis, the number of receivers at which certain conditions exist. For example, it may be desired to obtain the "rating" of a particular program by determining the number of receivers actually operating to receive the program. Again, it may be desired to obtain the response of the audience to a question transmitted from the program source, by determining the number of users of the receivers responding in a particular way to the question. Present methods of conducting audience surveys involve such techniques as spot telephone calls, mail questionnaires, personal interviews and the installation of a mechanical recording device at each receiver. The first three techniques are obviously expensive, slow, and are liable to be resented by system subscribers as an unnecessary intrusion on their privacy. The technique involving installation of a mechanical recording device at each receiver, while probably not resented as much by the subscriber, is slow in yielding the results of the survey and is expensive, since it usually involves changes in the receiver itself.

Accordingly, it is an object of this invention to provide a method of conducting an audience survey in a closed-circuit distribution system for radio or television signals and the like; which method is simple and economical to practice and rapidly yields the results of the survey.

It is a further object of this invention to provide a closed-circuit distribution system for radio or television signals and the like, having means included therein for conducting an audience survey; which means are rapid and accurate in operation and are not liable to be resented by the system subscribers.

It is a still further object of this invention to provide a closed-circuit distribution system for radio or television signals and the like, having means included therein for conducting an audience survey; which means are relatively inexpensive to install and maintain and are adapted for use with continuously operative recording apparatus.

Briefly, the invention contemplates the transmission of an audience survey signal over the transmission line coupling the source of communications signals with each of the receivers in a closed-circuit distribution system for radio or television communications signals; varying an electrical characteristic of the survey signal by a predetermined amount at each of the receivers, in response to a condition existing at the receiver; and measuring, at the central station, the total variation in the electrical characteristic of the survey signal caused by the variations at the receivers. Since the variation in the electrical characteristic of the survey signal at each of the receivers is by a predetermined amount, the total variation in the survey signal measured at the central station is the algebraic sum of all the predetermined variations and is, therefore, an indication of the number of receivers at which the condition exists. When the predetermined variation in the electrical characteristic of the survey signal is made in response to the operating condition of the receiver, the total variation in the electrical characteristic at the central station will be an indication of the number of receivers actually operating to receive the signals from the source of communications signals. This, of course, would be valuable information in determining the "ratings" of the various programs transmitted to the system subscribers from the source of communications signals. Should the predetermined variation in the electrical characteristic of the survey signal at each receiver be made in response to a manipulation by the user of the receiver, the invention permits the response of the audience to questions transmitted from the central station to be ascertained. When the source of communications signals transmits a question to the audience, the user of a receiver can indicate his response to the question by causing a predetermined variation in the electrical characteristic of the survey signal. The total variation in the electrical characteristic, as measured at the central station, will then provide an indication of the number of subscribers responding in a particular way to the question. Thus, a poll of audience reaction may be readily taken.

Apparatus for conducting the audience survey may include a source of substantially constant D.C. voltage coupled across the transmission line at the central station. This D.C. voltage source constitutes a source of audience survey signals and produces an audience survey current in the transmission line, so that the line carries both communications signals and survey signals. A variable resistance means is provided at each of the receivers and is coupled across the transmission line thereat. Each of the variable resistance means is adapted to be varied a predetermined amount in response to a condition existing at the receiver associated therewith, so that the survey current in the transmission line is also varied by a predetermined amount. Isolating means are provided in the coupling between the source of communications signals and the transmission line and in the couplings between the receivers and the line, to electrically isolate the source and the receivers from the audience survey signals, so that the survey signals may only be varied by operation of the variable resistance means. Because of this arrangement, the total variation in the audience survey current at the central station will be the algebraic sum of all the predetermined variations caused by operation of the variable resistance means. Accordingly, the total variation in the survey current will be an indication of the number of receivers at which the condition exists and may be measured and indicated by means located at the central station. The measuring and indicating means may be suitably calibrated, so that they directly indicate the number of receivers at which the condition exists. Furthermore, the measuring and indicating means may also include continuously operative recording means which provide a continuous record of the number of receivers at which the condition exists, so that variations in the number of receivers with respect to time may be readily ascertained.

The variable resistance means located at each of the receivers may take any one of several forms, depending upon the information which the audience survey seeks to obtain. If it is desired to determine the number of receivers actually operating to receive signals from the source of communications signals, the resistance means must be made responsive to the operating condition of the receiver associated therewith. In this case, the variable resistance means may comprise a resistor of predetermined value and a relay having an energizing coil and switch contacts. Means are provided to connect the relay contacts and the resistor across the transmission line and to energize the relay coil when the associated receiver is energized, so that the resistor is connected across the line only when the receiver is in operation. Thus, the resistance across the line is infinite when the receiver is not operating and is of a predetermined value when the receiver is operating. If desired, an alternative arrangement employing a resistor of predetermined value and a pair of switches may be utilized for the variable resistance means. This arrangement is especially suited for closed-circuit systems having a plurality of communications signal sources and transmission lines coupled to the receivers. Since each receiver must be adapted to be coupled to each transmission line, a line selector switch is provided at each receiver to perform this function. The line selector switch may have switch positions for coupling the receiver to each of the lines and an off position in which the receiver is not coupled to any line. A resistor of predetermined value is connected to the circuit junction of the line selector switch and the receiver coupling means which couple the receiver to the selector switch, so that the resistor is connected across the same transmission line as the receiver associated therewith. A power supply switch is connected to the power supply line for the receiver so that it controls the operating condition of the receiver. This power supply switch is mechanically connected to the line selector switch, so that the receiver is energized when the selector switch couples it to a transmission line and is not energized when the selector switch is in the "off" position. Since the resistor is only connected across a transmission line when the associated receiver is also so connected, it will cause a predetermined variation in the audience survey current in that line only when the receiver is actually operating to receive signals.

The variable resistance means may take another form if the audience survey seeks to obtain the reaction of the audience to questions transmitted from the source of communications signals. In this form, the resistance means may comprise a resistor of predetermined value and a manually operable switch. The resistor and switch are connected across the same transmission line as the receiver associated therewith, so that the resistor is taken out of, or placed in, circuit with the source of survey signals in response to operation of the switch by the user of the receiver. Thus, if the transmitted question requires an affirmative response, the user of the receiver may actuate the switch to cause a predetermined variation in the audience survey current. Similarly, a question requiring a negative response may also be "answered" by actuating the switch. For both questions, the measuring and indicating means at the central station will indicate the number of users responding to the question. Should the transmitted question require either an affirmative or negative response, two resistors of predetermined value and two switches may be employed. In this case, one switch functions to place one of the resistors in circuit with the source of survey signals and the other switch functions to take the other resistor out of circuit with the survey signal source. Thus, one switch may be actuated to give an affirmative response and the other switch actuated to give a negative response and the audience survey current correspondingly increased or decreased by predetermined amounts. The total variation in the audience survey current will then indicate the difference between the number of users responding affirmatively and the number of users responding negatively, as well as the affirmative or negative character of the difference, so that the reaction of the audience to transmitted questions may be ascertained.

For a fuller understanding of the nature and objects of the invention, reference should be had to the following detailed description taken in connection with the accompanying drawings, in which.

Figure 1:
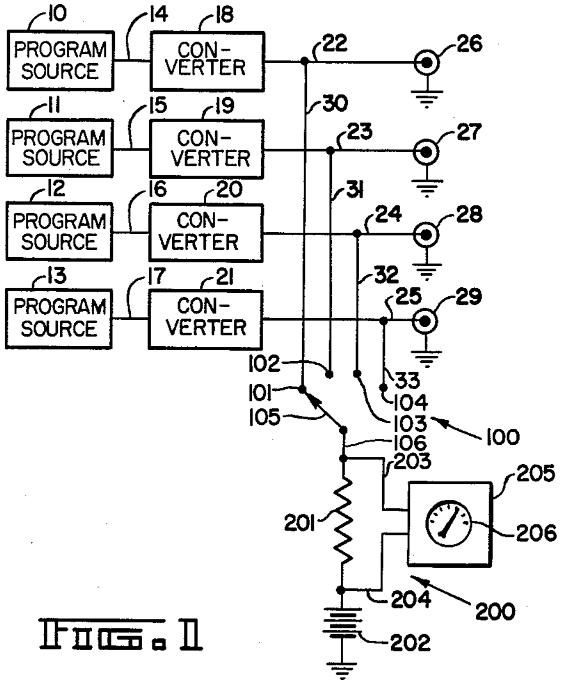
FIG. 1 is a schematic diagram of apparatus located at the central station of a closed-circuit distribution system for television signals.

While the invention is applicable to closed-circuit distribution systems for either radio or television signals and the like, the detailed description of the invention will be made with reference to a closed-circuit distribution system for television signals. Referring now to FIG. 1 of the drawing, there is shown a central station arrangement for a closed-circuit television system. The central station is usually located in the area to be served by the distribution system and may comprise a plurality of program sources 10, 11, 12 and 13, which produce the television signals to be distributed by the system. The program sources 10–13 may be television transmitters actually located at the central station or may be the receiver portions of microwave relay systems which relay signals from remotely located television transmitters. The television signals from sources 10–13 are applied to frequency converts 18–21 by means of leads 14–17, so that they are changed in frequency to a common value suitable for transmission over transmission lines 26–29. Present regulations of the Federal Communications Commission require that television broadcast signals from a transmitter occup a channel 6 mc. wide in the VHF band of 54 to 216 mc. While television signals have separate carriers for the audio and video portions of the signal, it is simpler to refer to the center frequency of the channel as the "carrier frequency" and accordingly, this will be done hereinafter. In closed-circuit distribution systems for television signals, it is desirable that the carrier frequencies of the signals in all the transmission lines have the same value so that interference caused by industrial, scientific, or medical sources and the like is reduced. It is also desirable that this value be lower than the range of broadcast frequencies, so that excessive line losses are prevented. Furthermore, the use of a common carrier frequency for the signals in the lines has the added advantage of permitting a single fixed frequency converter to be used at each receiver in the system. A suitable value of carrier frequencies for the signals in the disclosed system has ben found to be in the region of 10 mc. The use of carrier frequencies in this region of the frequency spectrum substantially minimizes local interference of the types mentioned above and keeps line losses down to a reasonable level. Therefore, each transmission line transmits a band of television frequencies from 7 to 13 mc. which has the required channel width of 6 mc. In the event that sources 10–13 are local television stations, it is possible to eliminate the frequency converters 18–21 by causing each station to transmit signals having a 10 mc. carrier.

The program sources 10–13 and their associated frequency converters constitute sources of television signals and are coupled to the transmission lines 26–29 by means of leads 22–25, so that a separate line carries the signals from each of the sources. Apparatus, identified generally as 200, is provided at the central station for conducting the audience survey. This apparatus is adapted to be connected to the transmission lines by means of a selectively operable switch 100 having fixed contacts 101–104 and a movable contact 105. The fixed contacts are connected to the transmission lines by means of leads 30–33 and the movable contact is connected to the survey apparatus 200 by a lead 106. The audience survey apparatus 200 includes a dropping resistor 201 and a source 202 of substantially constant D.C. voltage which are connected in series between ground and the movable contact 105 of switch 100. The D.C. voltage source 202 constitutes the source of audience survey signals and may comprise any substantially constant D.C. voltage source, such as, for example, the battery illustrated. Leads 203 and 204 serve to connect a suitable D.C. current measuring instrument 205 across the resistor 201, so that the audience survey current in the lead 106 may be measured. An indicator dial 206 is provided on the instrument to display the results of the audience survey. If desired, the instrument 205 may also be a recording meter of any suitable type which produces a continuous record, with respect to time, of the value of the audience survey current. As thus far described, the audience survey apparatus permits the D.C. voltage source 202 to be connected to any one of the transmission lines 26–29 by operation of the switch 100, so that the lines may carry both television and audience survey signals. For continuous monitoring of each line, an individual recording instrument may be permanently connected across each line with its associated D.C. voltage source and dropping resistor, or a single recording instrument, i.e., a single chart with multiple pens, may be used. If desired, a single D.C. voltage source may be utilized to supply the audience survey current for all of the transmission lines.

Figure 2:
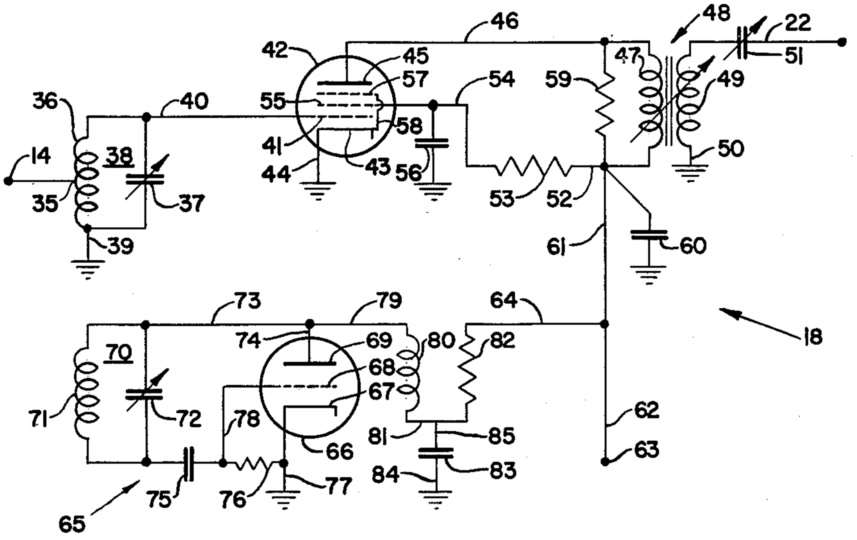
FIG. 2 is a circuit diagram of a frequency converter suitable for use in the central station of FIG. 1.

FIG. 2 of the drawing shows a frequency converter suitable for use as any one of the converters 18–21 in the central station. The signals from the program source, taken for example as source 10, are coupled by lead 14 to the tap 35 of a coil 36. Coil 36 and variable capacitor 37 form a tuned circuit 38 which is tuned to the incoming frequencies from source 10. The tuned circuit 38 is coupled between ground and the grid 41 of a mixer tube 42 by leads 39 and 40. Tube 42 also includes a cathode 43, which is connected directly to ground by lead 44, and a plate 45, which is connected by lead 46 to the primary winding 47 of a variable transformer 48. The secondary winding 49 of the transformer is connected to ground by a lead 50 and to transmission line 26 through a variable capacitor 51 and lead 22. Voltage for the screen grid 55 of tube 42 is applied by way of leads 54, 52, 61 and 62 and resistor 53 from a terminal 63 connected to a source of plate supply voltage, not shown. Capacitor 56 serves as an RF bypass capacitor in the screen grid connections. The suppressor grid 57 of the tube 42 is internally connected to the cathode by a lead 58. The plate circuit of mixer tube 42 is completed by a resistor 59 and a capacitor 60 which provide an RF ground connection and which also serve to isolate the plate supply voltage from the ground. A lead 64 connects the plate supply voltage appearing at terminal 63 to an oscillator, indicated generally as 65, so that a single plate supply is used for both the mixer and oscillator tubes of the converter. Oscillator 65 includes a triode 66 having a cathode 67, a control grid 68 and plate 69. A tuned circuit 70 comprising coil 71 and variable capacitor 72 is coupled between the plate and cathode by leads 73 and 74, capacitor 75 and resistor 76. Lead 77 serves to ground the cathode of tube 66, while lead 78 places the tuned circuit 70 in circuit between the plate and grid of the tube, so that an oscillator circuit is formed. Leads 79, 81, 64 and 62, coil 80, and resistor 82 complete the plate supply voltage connections for tube 66. A capacitor 83 is connected between ground and the junction of coil 80 and resistor 82 by leads 84 and 85, so that an RF ground connection is provided for the plate circuit of tube 66.

In operation, the converter of FIG. 2 functions to change the frequency of the signals from source 10 of FIG. 1 to the 10 mc. band of carrier frequencies used for distribution of the signals over transmission line 26. The tuned circuit 70 is tuned to the required "heterodyning" frequency, so that oscillator 65 produces signals of this frequency, which are then introduced into the grid-cathode circuit of mixer tube 42 by means of an inductive coupling between coil 36 and coil 71. Since the output frequency of the converter is the difference between the frequency of the applied signals and the heterodyning frequency, the value of the heterodyning frequency is dependent upon the particular carrier frequency of the signals from source 10. The output from the mixer tube 42, appearing across primary winding 47, will then be the television signals from source 10 at the required 10 mc. carrier frequency. It may be noted that coupling capacitor 51, which couples the output of the converter to the transmission line, also serves to prevent the audience survey current in the line from reaching the converter itself, so that the survey signals are not affected by the operation of the program source and/or the frequency converter.

Figure 3:
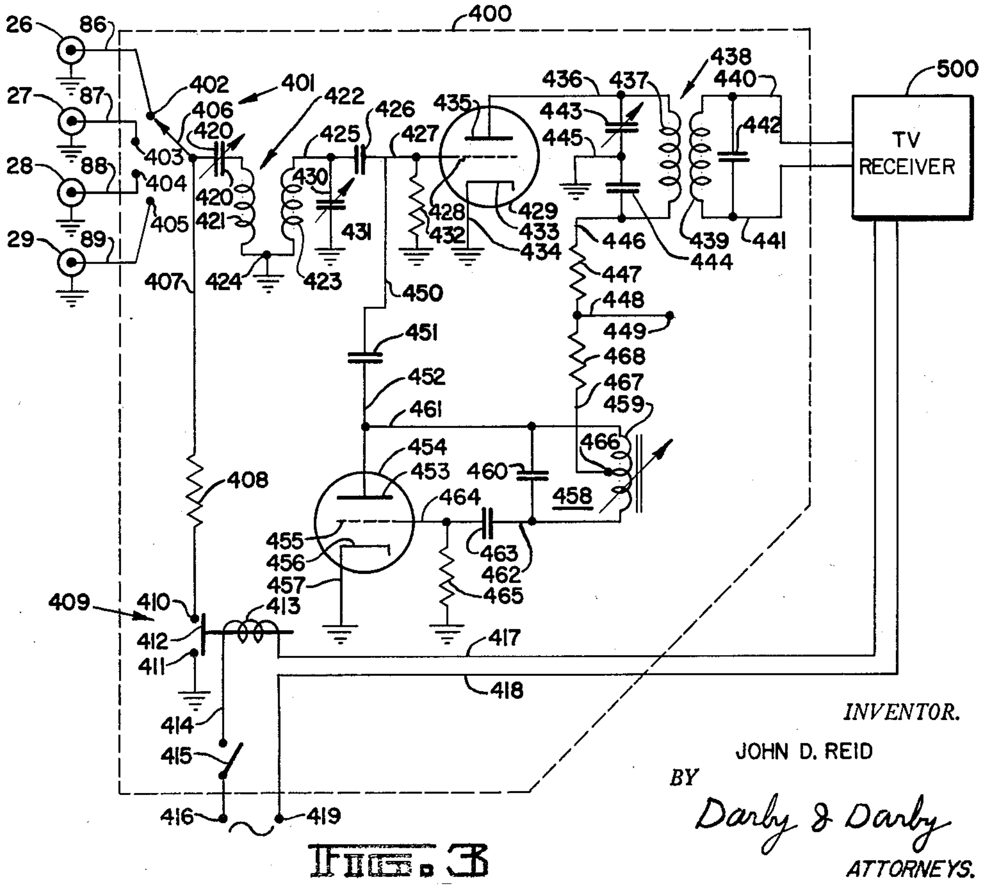
FIG. 3 is a circuit diagram of apparatus located at each of the television receivers of the closed-circuit distribution system.

FIG. 3 of the drawing shows the circuit diagram of a typical installation at one of the television receivers in the closed-circuit distribution system. As shown therein, an adapter 400 is located at a television receiver 500, which may be any commercially available broadcast receiver. The adapter 400 serves to couple the television signals from transmission lines 26–29 to the receiver 500 and also to convert the carrier frequency of the signals to a frequency which the receiver is designed to receive. In addition, the adapter contains the portion of the audience survey apparatus which is located at the receivers. The transmission lines 26–29 are connected to the fixed contacts 402–405 of a line selector switch 401 by means of leads 86–89. A movable contact 406 of the selector switch is adapted to be connected to ground by lead 407, audience survey resistor 408 and the contacts 410, 411, 412 of a relay 409. The energizing coil 413 of the relay has one end connected to a terminal 416 of a power supply source, not shown, by lead 414 and switch 415. The other end of the coil 413 is connected to lead 417 which constitutes one of the power supply lines for the receiver 500. A lead 418, which may be the other power supply line of the receiver, is connected directly to a terminal 419, which is the other terminal of the power supply source. This arrangement places the energizing coil of relay 409 in series with the power supply lines of receiver 500, so that the relay is operated when switch 415 is closed to energize the receiver. Since the relay contacts 410–412 are open when the relay is not energized, the survey resistor 408 is connected to ground only when the receiver 500 is energized by closing switch 415.

The movable contact 406 of line selector switch 401 is also coupled to the primary winding 421 of a transformer 422, by a coupling capacitor 420. A secondary winding 423 of the transformer has one end connected to ground and to the free end of primary winding 421, at point 424. The other end of secondary winding 423 is coupled to the grid 428 of a triode mixer tube 429 by means of lead 425, coupling capacitor 426, and lead 427. A grid resistor 432 is connected between grid 428 and ground and combines with capacitor 426 to form a conventional R-C coupling network. The secondary winding 423 of transformer 422 is tuned to the center, or carrier, frequency of the television signals received from the transmission lines 26–29, by a variable capacitor 431, which is connected between ground and the high potential side of winding 423 by a lead 430. Since the transmitted television signals occupy a band of frequencies from 7 to 13 mc., with a center frequency at 10 mc., the parallel circuit formed by winding 423 and capacitor 431 should be tuned to 10 mc. and have a band-pass characteristic sufficient to pass the 6 mc. wide band of television signals. The mixer tube 429 also has a cathode 433, which is directly connected to ground by a lead 434, and a plate 435, which is connected to the primary winding 437 of a transformer 438, by lead 436. Transformer 438 is an output transformer for mixer tube 429 and has a secondary winding 439, which is connected across the signal leads 440 and 441 of the television receiver. A capacitor 442 is arranged to tune the secondary winding of the output transformer to the center frequency of the television channel to which the receiver 500 is tuned, so that a selective band-pass characteristic is obtained which passes the 6 mc. band of signal frequencies. For example, if the television receiver is left fixed-tuned to channel 6, the capacitor 442 and secondary winding 439 would be tuned to 85 mc., which is the center of the 82–88 mc. frequency limits of the channel. Similarly, the primary winding 437 of the output transformer may be tuned to the same frequency by capacitors 443 and 444. The circuit junction of capacitors 443 and 444 is grounded by a lead 445, so that an RF ground is provided for the plate circuit of mixer tube 429.

The plate supply voltage for triode 429 is obtained from a terminal 449 of a supply source, not shown, by means of lead 448, resistor 447, lead 446, coil 437 and lead 436. Leads 427, 450, coupling capacitor 451 and lead 452 are provided to couple the grid of tube 429 to the plate 453 of an oscillator tube 454. The oscillator tube illustrated is a triode and has a grid 455 and a cathode 456. Cathode 456 is directly connected to ground by a lead 457. A tuned circuit 458, comprising coil 459 and capacitor 460, is coupled between the plate and grid of triode 454 by leads 461, 462, 464 and an R-C coupling network composed of capacitor 463 and resistor 465. The plate supply voltage for tube 454 is obtained from the same plate supply source used for mixer tube 429. For this purpose, a center-tap 466 located on coil 459 is connected to the terminal 449 of the plate supply source, by means of lead 467, resistor 468 and lead 448. The tuned circuit 458 of the oscillator is tuned to the heterodyning frequency, so that signals of this frequency are applied to the grid of mixer tube 429 by means of the coupling capacitor 451. Thus, when the center frequency of the distributed television signals is chosen to be 10 mc. and the television receiver is left fixed-tuned to channel 6 (82–88 mc.), the tuned circuit 458 could be tuned to a frequency of 95 mc. By this arrangement, the 7–13 mc. band of television signals received from transmission lines 26–29 is converted to a band of frequencies (82–88 mc.), which the television receiver 500 is adapted to receive. While the receiver could be left fixed-tuned to television channels other than channel 6, it has been found desirable to utilize either channel 5 or channel 6 for this purpose, depending upon which of these channels is not being used locally. By employing one of these channels and by choosing a heterodyning frequency higher than the distribution frequencies of the television signals, spurious responses resulting from high order combinations and image responses of the adapter oscillator and receiver oscillator are minimized.

The line selector switch 401 serves to couple the adapter 400 and the television receiver 500 to one of the transmission lines 26–29, so that the subscriber may choose which of the programs being distributed over the lines that he wishes to receive. Variable capacitor 420 functions to couple the television signals at switch 401 to the receiver and also to prevent the D.C. audience survey signals from reaching the adapter and receiver. By this means, the audience survey current is made responsive only to the variable resistance means of the audience survey apparatus at each receiver. The survey current thus flows from the transmission line through the switch 401, lead 407, resistor 408 and contacts 410–412 to ground. Since the receiver 500 and its associated audience survey circuit are coupled in parallel across the transmission line to which the receiver is connected, the audience survey resistor 408 of the receiver is connected in series-circuit with respect to the D.C. voltage source 202 (FIG. 1) at the central station, and is connected in parallel with the audience survey resistors of the other receivers. When the television receiver 500 is not operating to receive signals, the coil 413 of relay 409 is not energized and a circuit is not completed for the survey resistor 408. When the receiver is energized to receive signals by closing switch 415, relay 409 operates to place survey resistor 408 in circuit with the audience survey signal source 202 at the central station. The survey resistor is given a predetermined value, so that the survey current in the transmission line 26 at the central station will increase by a predetermined amount. Thus, the operating condition of each of the television receivers of the system can be made known at the central station by this predetermined variation in the magnitude of the audience survey current. Since measuring and indicating means 205 is responsive to the total variation of the survey current, it will provide an indication of the number of receivers coupled to a particular transmission line actually operating to receive signals from the line. If desired, dial 206 may be calibrated to read this number directly. The measuring and indicating means may also include conventional continuously operative D.C. recording apparatus in each line, so that a permanent record of the variations in the number of operating receivers with respect to time may be had for each line.

As thus far described, the invention permits an audience survey to be made which quickly and accurately determines the number of receivers in a closed-circuit system actually operating to receive signals from a particular source of television signals at the central station. The system subscribers are not annoyed by personal contacts, such as telephone calls or letters, since the desired information is obtained without their knowledge. The adapter apparatus 400 shown in FIG. 3 may be compactly packaged for installation at the subscriber's television receiver. Since this apparatus includes an "on-off" switch for the receiver and a line selector switch, it is possible to locate it at a point remote from the receiver, so that the subscriber is given the benefit of "remote control" for his receiver. Furthermore, installation costs are reduced because no internal changes are required to be made in the television receiver itself.

Figure 4:
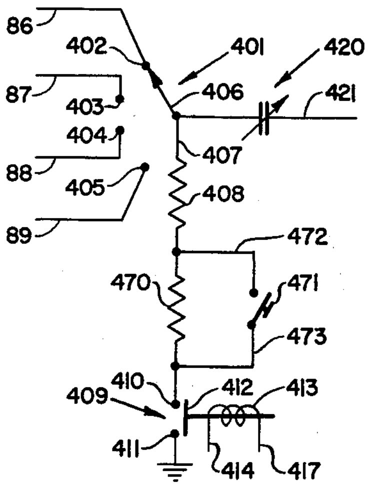
FIG. 4 is a circuit diagram of apparatus which may be located at each of the television receivers of the system, to permit the response of the audience to transmitted questions to be ascertained.

FIG. 4 of the drawing shows survey apparatus which may be included in adapter 400 at the television receiver 500, to permit the reaction of the audience to transmitted questions to be ascertained. In this figure, the same reference characters are employed to identify the same elements shown in FIG. 3. As illustrated, a resistor 470 is placed in the audience survey circuit between survey resistor 408 and the contacts 410–412 of relay 409. This added resistor is given a predetermined value, so that its addition to, or removal from, the audience survey circuit will cause a variation in the survey current of a predetermined amount. A manually operable switch 471 is connected across the ends of resistor 470 by leads 472 and 473, so that the resistor may be removed from the survey circuit by "shorting it out" when switch 471 is actuated. Switch 471 is intended for operation by the user of the television set, to indicate his response to questions transmitted from the central station. For example, if the question transmitted required an affirmative answer, the subscriber could depress switch 471 to indicate his affirmative answer. Similarly, if the transmitted question required a negative answer, the subscriber could actuate switch 471 to indicate this answer. Since the actuation of the switch by the subscriber produces a predetermined variation in the survey current at the central station, the total variation in the survey current at the central station will provide an indication of the number of subscribers responding to the question. In the illustrated arrangement, the resistor 470 is in series-circuit relation with the survey resistor 408 when switch 471 is not actuated, so that it also functions as a survey resistor when a survey is being made to determine the number of receivers tuned to receive a particular program. Therefore, when the television receiver is energized, both resistors operate together to cause the predetermined variation in the survey current. If desired however, switch 471 could be of the normally closed type, so that resistor 470 would not be in the survey circuit unless the switch was actuated during the taking of an audience reaction survey.

Figure 5:
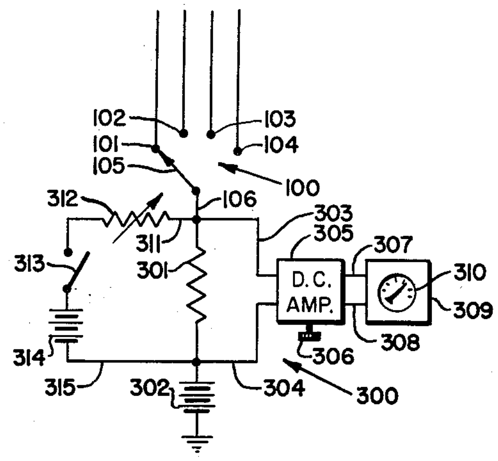
FIG. 5 is a circuit diagram of apparatus which may be located at the central station for use with the apparatus of FIG. 4.

Central station apparatus for use with the survey apparatus of FIG. 4, is illustrated in FIG. 5 of the drawing. As shown therein, audience survey apparatus 300 includes a resistor 301 and a source 302 of audience survey signals, which are series-connected between ground and the movable contact 105 of switch 100. The D.C. voltage across resistor 301 caused by the audience survey current is applied to the input of a D.C. amplifier 305 by leads 303 and 304. Amplifier 305, which may be any conventional variable gain D.C. amplifier, has a means 306 for adjusting its gain. The output of the amplifier is connected to a D.C. current measuring instrument 309 having a dial 310, by leads 307 and 308, so that the instrument is adapted to measure and indicate the magnitude of the survey current in lead 106. The amplifier 305 is employed to calibrate the instrument 309 and to make the zero setting adjustment. If desired, the instrument 309 may be a D.C. recording meter of conventional type, so that a permanent record of the survey results may be obtained. An adjusting circuit comprising variable resistance 312, switch 313 and D.C. voltage source 314 is connected across resistor 301 by leads 311 and 315.

In order to determine the reaction of the audience to transmitted questions, the following procedure may be employed. First, switch 100 is set to connect the source of survey signals 302 to the transmission line which couples the television signal source chosen for the survey to the receivers. Since the contacts of relay 409 are closed for each receiver in an operative condition, the magnitude of the audience survey current in the transmission line will provide an indication of the number of receivers operating to receive signals from the chosen source of television signals. The number of such receivers may then be read directly on dial 310 of instrument 309. Next, switch 313 is closed and variable resistance 312 is adjusted to cause a D.C. current from source 314 to flow in resistor 301. This current is equal in magnitude and opposite in polarity to the survey current, so that the net voltage across resistor 301 becomes zero and instrument 309 provides a zero indication. The desired question is then transmitted from the chosen source of television signals and the subscribers wishing to respond to the question, do so, by actuating switch 471. This causes an increase in the survey current, the amount of the increase providing an indication of the number of subscribers responding to the question. When resistors 408 and 470 are of equal value, the reading on dial 310 will indicate directly the number of subscribers responding to the question. Should the resistors 408 and 470 not be of equal value, a separate scale may be provided on dial 310, so that the number of responding subscribers may be read directly. If it is desired to obtain readings of audience response in percentage, an additional step may be included after the step of balancing out the survey current in resistor 301 by adjustment of variable resistance 312. This step involves the setting of the full scale sensitivity of meter 309 to be double the normal current in resistor 301 before balancing, so that a full scale reading would indicate a 100% audience response and a one-half scale reading would indicate a 50% response. The procedure outlined thus far yields the number of receivers at which the question is received and the number of, or percentage of, users of the receivers responding to the question. The difference between these numbers represents the number of subscribers not responding to the transmitted question. Since the non-responding subscribers may have failed to respond either because they had no opinion, or because they had a different response than the one required by the question, the question may be asked again to determine the number of such subscribers having a different response.

Figure 6:
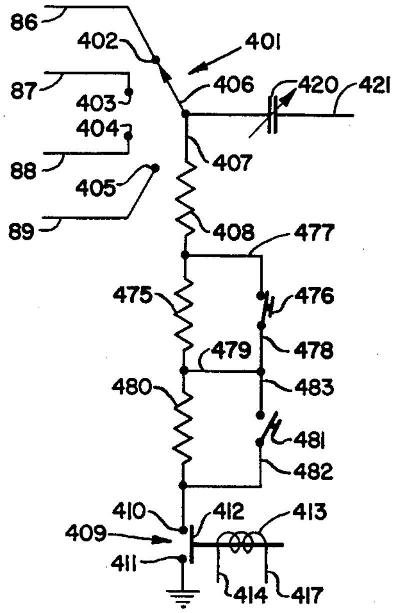
FIG. 6 is a circuit diagram of apparatus which may be located at each of the television receivers of the system, to permit both affirmative and negative responses of the audience to transmitted questions to be ascertained.

The invention also contemplates an arrangement whereby the system subscribers are permitted to respond either affirmatively or negatively to the transmitted question, thus avoiding the necessity of asking the same question twice, to determine both responses. As shown in FIG. 6 of the drawing, the audience survey circuit at each receiver includes the survey resistor 408 and a pair of resistors 475, 480, which preferably have the same predetermined value. Resistor 475 has a switch 476 shunted thereacross by leads 477, 478 and 479, while resistor 480 is similarly connected to a switch 481 by leads 482, 483 and 479. Switch 476 is normally closed, so that resistor 475 is not in the survey circuit unless the switch is actuated. Switch 481 is normally open, so that resistor 480 is included in the survey circuit unless the switch is actuated. By this means, the audience survey current may be made to increase or decrease by a predetermined amount, depending on which of the switches 476, 481 is actuated. Thus, the user of the television receiver may indicate an affirmative or negative response to a transmitted question by depressing one or the other of these switches. Since the audience survey current may increase or decrease when the audience responds to the transmitted question, the instrument 309 shown in FIG. 5, may be "converted" to a center scale reading instrument by setting the full scale sensitivity of meter 309 to be double the average survey current. This may be done by closing switch 313 and adjusting resistance 312 for a one-half scale reading.

It may be noted that an affirmative response by one subscriber and a negative response by another subscriber "cancel" each other, so that the survey current is left unchanged. Accordingly, the reading on dial 310 of instrument 309 will indicate the difference between the number of subscribers responding affirmatively and the number of subscribers responding negatively. The character of the difference, i.e. affirmative or negative, will be indicated by an increase or decrease in the survey current and may be readily displayed by the use of the center scale arrangement on instrument 309. For direct reading in percentage, a logarithmic meter scale may be utilized in which one-half of midscale current corresponds to the same downward deflection as the upward deflection resulting from double the midscale current. The logarithmic deflection may be obtained by causing amplifier 305 to have a log characteristic.

Figure 7:
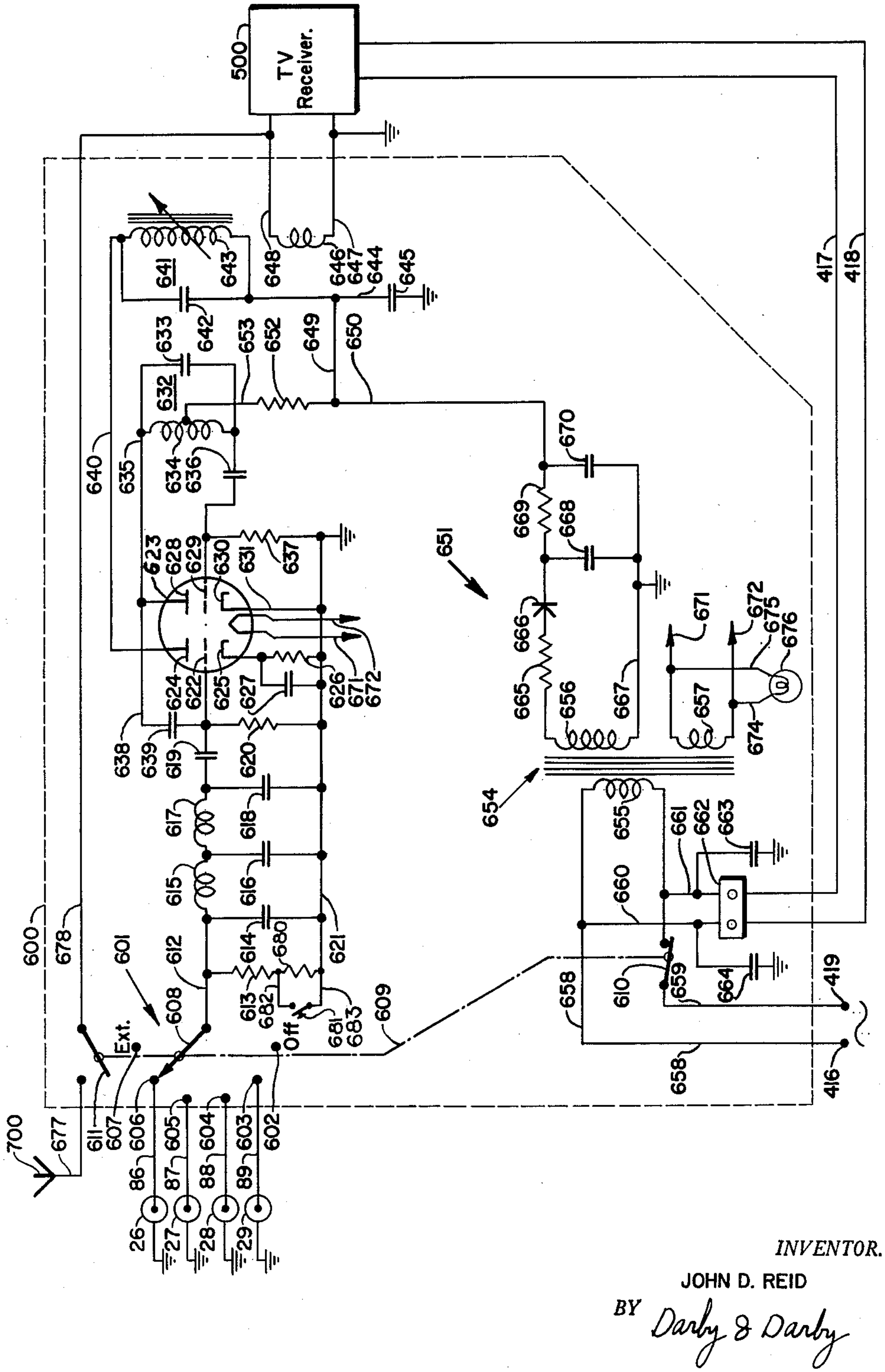
FIG. 7 is a circuit diagram of apparatus located at each of the television receivers of the system and constitutes an alternative embodiment of the invention.

FIG. 7 of the drawing illustrates an alternative embodiment of the invention which may be employed in place of the arrangement shown in FIG. 3. As shown in FIG. 7, an adapter 600 is interposed between television receiver 500 and the signal leads 86–89 of transmission lines 26–29. The adapter includes a line selector switch 601 which has fixed contacts 602–607 and a movable contact 608. Contact 602 is an "off" position for the switch, in which the receiver 500 is not coupled to any transmission line, while contacts 603–606 serve to couple the receiver to the lines 26–29. Contact 607 represents a switch position in which the receiver 500 is coupled to receive signals from an external antenna 700, by means which will be described hereinafter. The movable contact 608 of the selector switch is coupled to the control grid 622 of a converter tube 623 by means of lead 612, a low-pass filter comprising capacitors 614, 616, 618 and coils 615, 617, and an R-C coupling network comprising capacitor 619 and resistor 620. An audience survey resistor 613 of predetermined value is connected between movable contact 608 and ground by means of leads 612 and 621. If desired, an audience response resistor 680 may be included in series circuit with resistor 613, so that the response of the audience to transmitted questions may be ascertained. Resistor 680 is connected in parallel with a response switch 681 by means of leads 682 and 683. The mixer portion of converter tube 623 includes control grid 622, plate 624 and cathode 625, while the oscillator portion comprises plate 628, grid 629 and cathode 630. Cathode 625 is coupled to ground through resistor 626 and RF bypass capacitor 627. Cathode 630 is connected directly to ground by leads 631 and 621. A common heater connection is provided for both cathodes by leads 671 and 672. The oscillator circuit employed in the converter is of the "floating Colpitts" type and includes a tuned circuit 632 comprising capacitor 633 and coil 634. The tuned circuit is coupled between the plate and grid of the oscillator portion of tube 623 by lead 635 and an R-C coupling network comprising capacitor 636, and resistor 637, while the output of the oscillator at plate 628 is coupled to the grid 622 of the mixer portion of the tube by means of lead 638 and capacitor 639. When the television signals are distributed over the transmission lines at a common carrier frequency of 10 mc. and the receiver 500 is left fixed-tuned to channel 6 (82–88 mc.), the tuned circuit 632 of the oscillator would be tuned to 95 mc., so that the television signals appearing at plate 624 of the converter tube 623 will be at a carrier frequency which the receiver is designed to receive. These signals are applied by a lead 640 to one side of an output circuit 641 comprising capacitor 642 and coil 643. The other side of the output circuit is connected to ground by a lead 644 and capacitor 645. A coil 646, which is inductively coupled to coil 643, is connected to the signal input terminals of television receiver 500 by leads 647 and 648. The output circuit 641 is tuned to the center frequency, 85 mc., of channel 6, so that the circuit has a band-pass characteristic sufficiently wide to pass the 6 mc. band of television signals transmitted.

A plate supply voltage for the mixer portion of tube 623 is obtained from plate supply source 651 and is applied by way of leads 650, 649, 644, coil 643 and lead 640 to plate 624. Source 651 also supplies the plate voltage for the oscillator portion of tube 623 by means of lead 650, resistor 652, lead 653, coil 634 and lead 635. Capacitor 645 serves to isolate the plate supply voltage from ground and to provide an RF ground connection for the output circuit 641. The plate supply source 651 includes a transformer 654 having a primary winding 655 and secondary windings 656 and 657. Primary winding 655 is connected across the terminals 416, 419 of a voltage supply source (not shown) by means of leads 658, 659 and a switch 610. A power receptacle 662 is connected in parallel with primary winding 655 by means of leads 660 and 661, so that the receptacle is energized by the voltage supply source when switch 610 is closed. The power receptacle is adapted to receive the power supply lines 417, 418 of the television receiver 500, so that energization of the receiver is also controlled by operation of switch 610. Capacitors 663 and 664 are connected between ground and the respective input leads to receptacle 662 to provide a low impedance path to ground for induced RF voltages. Secondary windings 656 and 657 produce respectively, the plate and filament supply voltages for converter tube 623. Winding 656 has one end connected to a rectifier 666 by resistor 665 and the other end connected to ground by a lead 667. The pulsating D.C. output voltage from rectifier 666 is passed through a filter circuit comprising capacitors 668 and 670 and resistor 669, to remove the ripple voltage, before being applied to the plates of tube 623. Secondary winding 657 is connected directly to the heater leads 671 and 672 of the converter tube and to a pilot lamps 676 by leads 674 and 675. From the foregoing description, it may be noted that switch 610 controls both the energization of the equipment in adapter 600 and the energization of television receiver 500. Since pilot lamp 676 is also controlled by this switch, the lamp provides an indication to the subscriber that the adapter and receiver are energized.

This embodiment of the invention also includes means for coupling the television receiver 500 to an external antenna 700, so that the receiver may receive signals other than those distributed over lines 26–29. To this end, the antenna is connected to the fixed contact of a switch 611 by lead 677 and the movable contact of the switch is connected to the input signal lead 648 of the receiver by a lead 678. The switch 611 is mechanically connected to the movable contact 608 of line selector switch 601 and to the power supply switch 610 by means shown schematically as 609. This "ganged" switch arrangement permits the line selector switch to control the operation of the television receiver, so that the subscriber may use the adapter 600 to remotely control his receiver if desired. When line selector switch 601 is in the "off" position, switches 610 and 611 are open and the receiver is not coupled to any transmission line. The adapter and receiver are not energized and the pilot lamp 676 is not lighted. When the selector switch is placed in one of the positions in which it couples the receiver to a transmission line, the power supply switch 610 is closed to energize the adapter and receiver and the pilot lamp becomes lighted. The antenna switch 611 remains open however, so that the receiver receives only the signals from the transmission line to which it is coupled. Movement of the line selector switch to the "external" position, closes switch 611 and uncouples the receiver from the transmission lines, so that the receiver operates to receive broadcast television signals only. In this position also, the power supply switch 610 remains closed and the pilot lamp remains lighted.

In general, the basic operation of this embodiment of the invention is quite similar to that of the embodiment shown in FIG. 3 of the drawing. The path for the audience survey current in lines 26–29 is through the movable contact 608 of the line selector switch, lead 612, survey resistor 613, resistor 680 and lead 621 to ground. Capacitor 619 serves to isolate the survey current from the frequency converter and television receiver, so that only the inclusion in, or removal from, the survey circuit of resistor 613 or resistor 680 causes a variation in the magnitude of the survey current. Since the survey resistor 613 is always coupled across the same transmission line as the receiver, the magnitude of the survey current at the central station will only be varied when the receiver is energized and is coupled to one of the transmission lines 26–29. The pilot lamp 676 provides a warning indication to the subscriber that the adapter is still energized should the receiver be deenergized by operation of its own "on-off" switch. When the line selector switch is in either the "off" position or the "external" position, the survey resistor is not coupled across any transmission line and therefore causes no variation in the survey current. Accordingly, the ganged switch arrangement and survey resistor combine to form a variable resistance which presents a resistance of predetermined value to the survey current when the receiver is energized and coupled to a transmission line, and a resistance of infinite value when the receiver is not energized, or is not coupled to a line. The audience response circuit including resistor 680 and switch 681 operates in the same manner as the circuit shown in FIG. 4 of the drawing. If desired, the double resistor-double switch arrangement shown in FIG. 6 may be employed so that the affirmative or negative response of the audience to transmitted questions may be determined. While the embodiment of the invention shown in FIG. 3 of the drawing offers the advantage of "fool-proof" operation, in that the survey resistor is only connected in the circuit when the television receiver is turned on, the embodiment shown in FIG. 7 offers the advantage of greater economy in manufacture.

It is believed apparent from the foregoing description that many changes could be made in the described construction and many seemingly different embodiments of the invention could be made, without departing from the scope thereof. For example, the audience survey signals may be A.C. signals of a frequency different from the range of frequencies of the communications signals. In such case, the isolating capacitors could be replaced by well known, selectively-tuned filter circuits, which discriminate against all but a selected range of frequencies. Similarly, the variable resistances in the audience survey apparatus at the receivers could be replaced by variable impedance means. Accordingly, it is intended that all matter contained in the above description, or shown in the accompanying drawing, shall be interpreted as illustrative and not in a limiting sense.

What is claimed is:

1. A closed-circuit distribution system for radio or television communications signals and the like, having means for conducting an audience survey, said system comprising at least one source of communications signals located at a central station; a source of audience survey signals located at said central station; a plurality of receivers adapted to receive said communications signals; a transmission line coupled to said communications and audience survey signal sources and to each of said receivers, so that said line carries both communications signals and audience survey signals; isolating means located at said source of communications signals and at each of said receivers for electrically isolating said communications signal source and said receivers from said audience survey signals; condition responsive means located at each of said receivers and coupled to said transmission line to receive said audience survey signals, said condition responsive means being operative to change an electrical characteristic of said survey signals by a predetermined amount in response to the operating condition of the receiver associated therewith; and means located at said central station for measuring and indicating the total change in the electrical characteristic of said survey signals, to thereby indicate the number of receivers actually operating to receive signals from said source of communications signals.

2. A close-circuit distribution system as claimed in claim 1, wherein said last-named means includes continuously operative recording means.

3. A closed-circuit distribution system for radio or television communications signals and the like, having means for conducting an audience survey, said system comprising at least one source of communications signals located at a central station; a source of audience survey signals located at said central station; a plurality of receivers adapted to receive said communications signals; a transmission line coupled to said communications and audience survey signal sources and to each of said receivers, so that said line carries both communications signals and audience survey signals; isolating means located at said source of communications signals and at each of said receivers for electrically isolating said communications signal source and said receivers from said audience survey signals; condition responsive variable impedance means located at each of said receivers and coupled to said transmission line thereat, said impedance means being varied a predetermined amount in response to the operating condition of the receiver associated therewith, so that an electrical characteristic of said audience survey signals at said central station is also varied a predetermined amount; and means located at said central station for measuring and indicating the total variation in the electrical characteristic of said survey signals caused by variation of said impedance means, to thereby indicate the number of receivers actually operating to receive signals from said source of communications signals.

4. A closed-circuit distribution system as claimed in claim 3, wherein said measuring and indicating means at said central station includes continuously operative recording means.

5. A closed-circuit distribution system for radio or television communications signals and the like, having means for conducting an audience survey, said system comprising a transmission line adapted to carry both A.C. and D.C. signals; a source of D.C. audience survey signals located at a central station, said source of survey signals being a source of substantially constant D.C.

voltage; connecting means for connecting said source of survey signals across said transmission line at said station, so that said line carries survey signals; a source of A.C. communications signals located at said central station; coupling means for coupling said communications signal source across said transmission line at said central station, so that said line also carries communications signals, said coupling means including means for electrically isolating said communications signal source from the audience survey signals; a plurality of receivers adapted to receive the signals from said source of communications signals; receiver coupling means for coupling each of said receivers across said transmission line, said receiver coupling means including means for electrically isolating said receivers from the audience survey signals; condition responsive variable resistance means located at each of said receivers, said resistance means being varied a predetermined amount in response to the operating condition of the receiver associated therewith; line connecting means located at each of said receivers for connecting said resistance means across said transmission line, so that variation of said resistance means by a predetermined amount causes the magnitude of the audience survey current at said central station to be varied a predetermined amount; and means located at said central station for measuring and indicating the total variation of said audience survey current at said station, to thereby indicate the number of receivers actually operating to receive signals from said source of communications signals.

6. A closed-circuit distribution system as claimed in claim 5, wherein said last-named means includes continuously operative recording means, said recording means being responsive to the total variations of said survey current at said central station.

7. A closed-circuit distribution system as claimed in claim 5, wherein said source of A.C. communications signals comprises a source of broadcast frequency communications signals and frequency conversion means for converting the frequency of the broadcast frequency signals to a lower frequency for transmission over said transmission line, and wherein said receiver coupling means also includes frequency conversion means for converting the frequency of the communications signals transmitted over said transmission line to a frequency which said receivers are designed to receive.

8. A closed-circuit distribution system as claimed in claim 5, wherein said variable resistance means comprises a resistor of predetermined value, a relay having an energizing coil and switch contacts, means for connecting said resistor and switch contacts to said line connecting means, so that said resistor is adapted to be connected across said transmission line upon energization of said relay coil, and means for energizing said relay coil in response to energization of the receiver associated therewith.

9. A closed-circuit distribution system as claimed in claim 5, wherein said variable resistance means comprises a resistor of predetermined value, a first switch, means for connecting said first switch and said resistor to said line connecting means, so that said resistor is adapted to be connected across said transmission line when said switch is operated, a second switch, means connecting said second switch in circuit with the power supply lines for the receiver associated therewith, so that said second switch is adapted to control the energization of the receiver, and means for mechanically connecting said first and second switches together, so that said resistor is connected across said transmission line whenever the receiver associated therewith is energized.

10. A closed-circuit distribution system for radio or television communications signals and the like, having means for conducting an audience survey, said system comprising a plurality of transmission lines, each of said lines being adapted to carry both A.C. and D.C. signals; a source of D.C. audience survey signals located at a central station, said source of survey signals being a source of substantially constant D.C. voltage; selectively operable connecting means adapted to connect said source of survey signals across each of said transmission lines at said station, so that the line to which said source is connected carries survey signals; a plurality of sources of A.C. communications signals located at said central station; coupling means for coupling each of said communications signal sources to a different one of said transmission lines at said central station, so that each of said lines carries communications signals from one of said communications signal sources, said coupling means including means for electrically isolating said communications signal sources from the audience survey signals; a plurality of receivers adapted to receive the signals from said sources of communications signals; variable resistance means located at each of said receivers, said resistance means being adapted to be varied a predetermined amount in response to a condition existing at the receiver associated therewith; selectively operable receiver switching means located at each of said receivers and adapted to couple each of said receivers and the variable resistance means associated therewith across each of said transmission lines, so that each receiver and the resistance means associated therewith are coupled to the same transmission line at the same time, the receiver thereby receiving signals from the source of communications signals coupled to that line and the variable resistance means being adapted to be placed in circuit with said source of audience survey signals when said source of survey signals is connected to that line; receiver coupling means for coupling each of said receivers to the receiver switching means associated therewith, said receiver coupling means including means for electrically isolating said receivers from the audience survey signals; means for connecting each of said variable resistance means to the receiver switching means associated therewith, so that variation of said resistance means by a predetermined amount causes a variation in the magnitude of the audience survey current at said central station in the transmission line to which the resistance means and source of survey signals are connected; and means located at said central station for measuring and indicating the total variations of the audience survey current at said station in each of said transmission lines, to thereby indicate for each of said lines the number of receivers coupled thereto at which said condition exists.

11. A closed-circuit distribution system as claimed in claim 10, wherein each of said sources of communications signals comprises a source of communications signals of a particular carrier frequency and frequency conversion means for converting that carrier frequency to a different carrier frequency which is the same for all of said sources of communications signals, so that all of said transmission lines carry communications signals having the same carrier frequency, and wherein said receiver coupling means also includes frequency conversion means for converting the carrier frequency of the communications signals transmitted over said lines to a frequency which each of said receivers is designed to receive.

12. A closed-circuit distribution system for television signals having means for conducting an audience survey, said system comprising a plurality of transmission lines, each of said lines being adapted to carry both A.C. and D.C. signals; a source of D.C. audience survey signals located at a central station, said source of survey signals being a source of substantially constant D.C. voltage; selectively operable switching means located at said central station, said switching means being adapted to connect said source of survey signals across each of said transmission lines, so that the line to which said source is connected carries survey signals; a plurality of television signal sources located at said central station; frequency conversion means associated with each of said television signal sources for converting the carrier frequency of the television signals from that source to a different carrier frequency which is the same for all said sources of television signals; coupling means for coupling the output of each of said frequency conversion means to a different one of said transmission lines at said station, so that each of said lines carries television signals from a different one of said television signal sources but at the same carrier frequency, said coupling means including means for electrically isolating said television signal sources and said conversion means from the audience survey signals; a plurality of television receivers each tuned to the same television channel; a line selector switch located at each of said receivers, said selector switch having switch positions for coupling the receiver associated therewith to each of said transmission lines; receiver coupling means located at each of said receivers for coupling the receiver to the line selector switch associated therewith, said receiver coupling means including frequency conversion means for converting the carrier frequency of the television signals transmitted over said lines to the carrier frequency which corresponds to the television channel to which said receivers are tuned and means for electrically isolating the frequency conversion means and the receivers from the audience survey signals; a resistor having a predetermined value located at each of said receivers; a relay having an energizing coil and switch contacts at each of said receivers; means at each of said receivers for connecting the resistor and the contacts of the relay at that receiver to the circuit junction of said receiver coupling means and said line selector switch, so that said resistor is adapted to be connected across the transmission line to which the receiver associated therewith is coupled upon energization of said relay coil, to thereby vary the audience survey current in that line at said central station by a predetermined amount; means at each of said receivers for connecting the energizing coil of said relay to the power supply lines for that receiver, so that said relay coil is energized when the receiver is energized; and means located at said central station for measuring and indicating the total variation of the audience survey current at said station in the transmission line to which said source of survey signals is connected, so that the number of said television receivers actually operating to receive television signals over that line is thereby indicated.

13. A closed-circuit distribution system for television signals having means for conducting an audience survey, said system comprising a plurality of transmission lines, each of said lines being adapted to carry both A.C. and D.C. signals; a source of D.C. audience survey signals located at a central station, said source of survey signals being a source of substantially constant D.C. voltage; selectively operable switching means located at said central station, said switching means being adapted to connect said source of survey signals across each of said transmission lines, so that the line to which said source is connected carries survey signals; a plurality of television signal sources located at said central station; frequency conversion means associated with each of said television signal sources for converting the carrier frequency of the television signals from that source to a different carrier frequency which is the same for all said sources of television signals; coupling means for coupling the output of each of said frequency conversion means to a different one of said transmission lines at said station, so that each of said lines carries television signals from a different one of said television signal sources but at the same carrier frequency, said coupling means including means for electrically isolating said television signal sources and said conversion means from the audience survey signals; a plurality of television receivers each tuned to the same television channel; a line selector switch located at each of said receivers, said selector switch having switch positions for coupling the receiver associated therewith to each of said transmission lines and an off position in which the receiver is not coupled to any transmission line; receiver coupling means located at each of said receivers for coupling the receiver to the line selector switch associated therewith, said receiver coupling means including frequency conversion means for converting the carrier frequency of the television signals transmitted over said lines to the carrier frequency which corresponds to the television channel to which said receivers are tuned and means for electrically isolating the frequency conversion means and the receiver from the audience survey signals; a resistor having a predetermined value located at each of said receivers; means for connecting said resistor to the circuit junction of said receiver coupling means and said line selector switch, so that said resistor is connected across the same transmission line as the receiver associated therewith by said selector switch and is not connected to any line when said selector switch is in the off position; a power supply switch located at each of said receivers; means for connecting said power supply switch to the power supply lines for the receiver associated therewith, so that said power supply switch is adapted to control the energization of the receiver; means for mechanically connecting said line selector switch to said power supply switch, said mechanical connecting means being operative to actuate said power supply switch in response to movement of said selector switch between the off position and any of the switch positions in which the receiver associated therewith is coupled to a transmission line, so that movement of said selector switch from the off position energizes the receiver associated therewith and connects said resistor across the same transmission line as the receiver, to thereby cause a predetermined variation in audience survey current in that line at said central station; and means located at said central station for measuring and indicating the total variation of the audience survey current at said station in the transmission line to which said source of survey signals is connected, so that the number of said television receivers actually operating to receive television signals over that line is thereby indicated.

14. A closed-circuit distribution system for television signals having means for conducting an audience survey, said system comprising a plurality of transmission lines, each of said lines being adapted to carry both A.C. and D.C. signals; a source of D.C. audience survey signals located at a central station, said source of survey signals being a source of substantially constant D.C. voltage; selectively operable switching means located at said central station, said switching means being adapted to connect said source of survey signals across each of said transmission lines, so that the line to which said source is connected carries survey signals; a plurality of television signal sources located at said central station; frequency conversion means associated with each of said television signal sources for converting the carrier frequency of the television signals from that source to a different carrier frequency which is the same for all said sources of television signals; coupling means for coupling the output of each of said frequency conversion means to a different one of said transmission lines at said station, so that each of said lines carries television signals from a different one of said television signal sources but at the same carrier frequency, said coupling means including means for electrically isolating said television signal sources and said conversion means from the audience survey signals; a plurality of television receivers each tuned to the same television channel; a line selector switch located at each of said receivers, said selector switch having switch positions for coupling the receiver associated therewith to each of said transmission lines; receiver coupling means located at each of said receivers for coupling the receiver to the line selector switch associated therewith, said receiver coupling means including frequency conversion means for converting the carrier frequency of the television signals transmitted over said lines to the carrier frequency which corresponds to the television channel to which said receivers are tuned and means for electrically isolating the frequency conversion means and the receiver from the audience survey signals; at least one variable resistance located at each of said receivers, said resistance being adapted to be varied a predetermined amount by the user of the television receiver associated therewith in response to questions transmitted from said sources of television signals; means for connecting said resistance to the circuit junction of said receiver coupling means and said line selector switch, so that said variable resistance is connected across the same transmission line as the receiver associated therewith by the selector switch, the variation of said resistance by the user of the receiver thereby causing a predetermined variation in the audience survey current in the transmission line at said central station; and means located at said central station for measuring and indicating the total variation of the audience survey current at said station in the transmission line to which said source of survey signals is connected, so that the number of said users responding to questions transmitted over that line is thereby indicated.

References Cited in the file of this patent

UNITED STATES PATENTS

| | | |
|---|---|---|
| 2,092,120 | Hopkins | Sept. 7, 1937 |
| 2,573,349 | Miller et al. | Oct. 30, 1951 |
| 2,654,651 | Black | Oct. 6, 1953 |
| 2,843,654 | Gottfried et al. | July 15, 1958 |

OTHER REFERENCES

"How TV Came to Panther Valley," Radio & Television News, March 1951 (pages 109 and 110 relied on).